(12) United States Patent
Handagama et al.

(10) Patent No.: US 8,864,878 B2
(45) Date of Patent: Oct. 21, 2014

(54) HEAT INTEGRATION OF A CEMENT MANUFACTURING PLANT WITH AN ABSORPTION BASED CARBON DIOXIDE CAPTURE PROCESS

(75) Inventors: Nareshkumar B. Handagama, Knoxville, TN (US); Rasesh R. Kotdawala, Knoxville, TN (US); Ajay Vajpeyi, Kolkata (IN)

(73) Assignee: ALSTOM Technology Ltd, Baden (CH)

( * ) Notice: Subject to any disclaimer, the term of this patent is extended or adjusted under 35 U.S.C. 154(b) by 483 days.

(21) Appl. No.: 13/243,129

(22) Filed: Sep. 23, 2011

(65) Prior Publication Data

US 2013/0074695 A1    Mar. 28, 2013

(51) Int. Cl.
*B01D 19/00* (2006.01)
*B01D 19/02* (2006.01)
*B01D 47/00* (2006.01)
*B01D 53/14* (2006.01)
*B01D 53/56* (2006.01)
*C04B 7/36* (2006.01)
*B01D 53/58* (2006.01)
*B01D 53/62* (2006.01)

(52) U.S. Cl.
CPC ............ *B01D 53/1425* (2013.01); *C04B 7/367* (2013.01); *B01D 53/1475* (2013.01); *B01D 53/58* (2013.01); *B01D 53/62* (2013.01); *B01D 2257/406* (2013.01); *B01D 2257/504* (2013.01); *B01D 2258/0233* (2013.01); *Y02C 10/06* (2013.01); *Y02C 10/04* (2013.01); *Y02C 10/08* (2013.01)
USPC .................. 95/156; 95/149; 95/178; 95/179; 95/232; 95/236; 423/220; 423/237; 96/243; 96/267; 96/155; 96/181; 96/218

(58) Field of Classification Search
None
See application file for complete search history.

(56) References Cited

U.S. PATENT DOCUMENTS

| 2,487,576 | A | | 11/1949 | Meyers | |
| 2,608,461 | A | | 8/1952 | Frazier | |
| 2,726,930 | A | * | 12/1955 | Edwards et al. | ............... 423/438 |
| 3,255,233 | A | | 6/1966 | Kunze et al. | |
| 3,563,696 | A | | 2/1971 | Benson | |
| 3,896,212 | A | | 7/1975 | Ecikmeyer | |
| 4,911,900 | A | * | 3/1990 | Horch et al. | ................... 423/235 |
| 5,318,758 | A | | 6/1994 | Fujii et al. | |
| 5,344,627 | A | | 9/1994 | Fujii et al. | |
| 5,378,442 | A | | 1/1995 | Fujii et al. | |
| 5,618,506 | A | | 4/1997 | Suzuki et al. | |
| 6,117,404 | A | | 9/2000 | Mimura et al. | |
| 6,423,282 | B1 | | 7/2002 | Araki et al. | |

(Continued)

FOREIGN PATENT DOCUMENTS

DE  10 2008 059370   6/2010
EP      0 502 596    9/1992

(Continued)

*Primary Examiner* — Frank Lawrence, Jr.
*Assistant Examiner* — Pankti Patel
(74) *Attorney, Agent, or Firm* — Cynthia W. Flanigan

(57) ABSTRACT

The present invention relates to methods and systems for improving the utilization of energy in a cement manufacturing plant comprising an absorption based contaminant, e.g. $CO_2$, capture process using thermal regeneration of a liquid absorbent. The methods and systems of the present invention are characterized in that the thermal regeneration of the liquid absorbent is at least partially effected using a hot exhaust gas stream generated in the kiln of the cement manufacturing plant.

10 Claims, 2 Drawing Sheets

(56) References Cited

U.S. PATENT DOCUMENTS

| | | |
|---|---|---|
| 6,485,547 B1 | 11/2002 | Iijima |
| 6,645,446 B1 | 11/2003 | Won et al. |
| 6,764,530 B2 | 7/2004 | Iijima |
| 6,800,120 B1 | 10/2004 | Won et al. |
| 6,883,327 B2 | 4/2005 | Iijima et al. |
| 7,056,482 B2 | 6/2006 | Hakka et al. |
| 7,316,737 B2 | 1/2008 | Mimura et al. |
| 7,377,967 B2 | 5/2008 | Reddy et al. |
| 7,964,168 B2 * | 6/2011 | Burkhardt et al. ............ 423/220 |
| 2004/0226441 A1 | 11/2004 | Palmer |
| 2006/0204425 A1 * | 9/2006 | Kamijo et al. ............. 423/437.1 |
| 2006/0248890 A1 | 11/2006 | Iijima et al. |
| 2007/0217981 A1 * | 9/2007 | Van Essendelft ............ 423/220 |
| 2008/0056972 A1 | 3/2008 | Iijima |
| 2008/0072762 A1 | 3/2008 | Gal |
| 2008/0223215 A1 | 9/2008 | Iijima et al. |
| 2009/0068078 A1 | 3/2009 | Grobys et al. |
| 2009/0305870 A1 | 12/2009 | Chung |
| 2010/0003177 A1 | 1/2010 | Aroonwilas et al. |
| 2010/0005722 A1 | 1/2010 | Iijima et al. |
| 2010/0050637 A1 | 3/2010 | Yamashita et al. |
| 2010/0258005 A1 | 10/2010 | Oishi et al. |
| 2010/0326074 A1 | 12/2010 | Okita et al. |
| 2011/0033359 A1 | 2/2011 | Papenheim et al. |
| 2013/0164200 A1 * | 6/2013 | Lail et al. ..................... 423/210 |

FOREIGN PATENT DOCUMENTS

| | | |
|---|---|---|
| EP | 0 879 631 | 5/2002 |
| EP | 1 695 756 | 8/2006 |
| EP | 2 085 133 | 8/2009 |
| EP | 2 258 461 | 12/2010 |
| EP | 2 269 711 | 1/2011 |
| EP | 2 269 712 | 1/2011 |
| EP | 2 269 713 | 1/2011 |
| EP | 2 286 894 | 2/2011 |
| FR | 2 938 454 | 2/2010 |
| GB | 871207 | 6/1961 |
| JP | 2004 292298 | 10/2004 |
| JP | 2009214089 | 9/2009 |
| JP | 2009215186 | 9/2009 |
| WO | WO 02/09849 | 2/2002 |
| WO | WO 03/013699 | 2/2003 |
| WO | WO 2004/005818 | 1/2004 |
| WO | WO 2005/069965 | 8/2005 |
| WO | WO 2007/009461 | 1/2007 |
| WO | 2007/012143 | 2/2007 |
| WO | WO 2007/019632 | 2/2007 |
| WO | WO 2007/068733 | 6/2007 |
| WO | WO 2007/107004 | 9/2007 |
| WO | WO 2008/094777 | 8/2008 |
| WO | WO 2009/003238 | 1/2009 |
| WO | WO 2009/004307 | 1/2009 |
| WO | WO 2009/035340 | 3/2009 |
| WO | WO 2009/065218 | 4/2009 |
| WO | WO 2009/104744 | 8/2009 |
| WO | WO 2009/112518 | 9/2009 |
| WO | WO 2010/010720 | 1/2010 |
| WO | WO 2010/051604 | 5/2010 |
| WO | WO 2010/015754 | 9/2010 |
| WO | WO 2010/102877 | 9/2010 |
| WO | WO 2010/113364 | 10/2010 |
| WO | WO 2010/122830 | 10/2010 |
| WO | WO2010133484 | 11/2010 |
| WO | WO2010/142716 | 12/2010 |

* cited by examiner

HEAT INTEGRATION OF A CEMENT MANUFACTURING PLANT WITH AN ABSORPTION BASED CARBON DIOXIDE CAPTURE PROCESS

FIELD OF THE INVENTION

The present invention relates to a method of cleaning an exhaust gas stream generated in a cement kiln.

BACKGROUND OF THE INVENTION

Cement manufacturing releases $CO_2$ into the atmosphere both directly when calcium carbonate is heated, producing lime and carbon dioxide, and also indirectly through the use of energy if its production involves the emission of $CO_2$. The cement industry is the second largest $CO_2$ emitting industry behind power generation. The cement industry produces about 5% of global man-made $CO_2$ emissions, of which 60% is from the chemical process, and 40% from burning fuel. The amount of $CO_2$ emitted by the cement industry is nearly 900 kg of $CO_2$ for every 1000 kg of cement produced.

Amine or ammonia based absorption processes, such as the monoethanolamine (MEA) based process, is considered to be a viable technology for capturing $CO_2$ from low-pressure exhaust gas streams, e.g. in cement manufacturing plants. $CO_2$ in the gas stream is captured in the liquid absorbent solution in an absorption process. A $CO_2$ absorber is employed to establish suitable conditions (temperature, pressure, turbulence, etc.) for chemical absorption of $CO_2$ from a mixed gas stream into the liquid absorbent.

The liquid absorbent containing absorbed $CO_2$ is subsequently regenerated, whereby absorbed $CO_2$ is separated from the absorbent, and the regenerated absorbent is then reused in the $CO_2$ absorption process. Thus, a circulating absorbent stream is formed. Regeneration is generally achieved by heating the liquid absorbent in a regenerator to a temperature at which $CO_2$ is released from the absorbent.

Regeneration of the liquid absorbent, for example using a stripper reboiler, is generally an energy intensive process. Accordingly, there is a need for processes that improve and optimize the utilization of energy in such systems.

SUMMARY OF THE INVENTION

An object of the present invention is to improve the utilization of energy in a cement manufacturing plant comprising an absorption based contaminant, e.g. $CO_2$, capture system or process using thermal regeneration of a liquid absorbent.

It has now been found that there exist opportunities to integrate energy intense carbon capture processes with the cement manufacturing process, such that the overall integrated process can be energy optimized. This is possible by minimizing the thermally relatively low-grade exhaust gas waste heat, by exploiting the temperature differences between the exhaust gas waste streams and the liquid absorbents in the $CO_2$ capture process.

According to aspects illustrated herein, there is provided a method of cleaning an exhaust gas stream generated in a cement kiln, the method comprising:
a) scrubbing in a scrubbing step a contaminant rich exhaust gas stream with a liquid absorbent such that a contaminant rich liquid absorbent is formed;
b) cleaning the contaminant rich liquid absorbent by heating it to separate contaminant from the liquid absorbent, such that a contaminant lean liquid absorbent is regenerated; and
c) recycling regenerated contaminant lean liquid absorbent for use in the scrubbing step;
characterized in that the heating of the contaminant rich liquid absorbent is at least partially effected using a hot exhaust gas stream generated in the cement kiln.

According to an embodiment the contaminant is $CO_2$ and the method comprises:
a) scrubbing in a scrubbing step a $CO_2$ rich exhaust gas stream with a liquid absorbent such that a $CO_2$ rich liquid absorbent is formed;
b) cleaning the $CO_2$ rich liquid absorbent by heating it to separate $CO_2$ from the liquid absorbent, such that a $CO_2$ lean liquid absorbent is regenerated; and
c) recycling regenerated $CO_2$ lean liquid absorbent for use in the scrubbing step;
characterized in that the heating of the $CO_2$ rich liquid absorbent is at least partially effected using a hot exhaust gas stream generated in the cement kiln.

The hot exhaust gas may be withdrawn from the cement plant kiln, either directly, e.g. from the kiln outlet, or after use in pre-heating of the cement raw materials and/or after being subjected to dust removal, e.g. electrostatic precipitation.

Exhaust gas directly from the kiln outlet may be at high temperature, typically in the range of 800-1200° C. The exhaust gas temperature after use in pre-heating of the cement raw materials and after being subjected to dust removal may typically range between 100-300° C. Since the temperature needed for regeneration of liquid absorbent in the $CO_2$ capture processes may typically be in the range of 100-200° C., a hot exhaust gas of suitable temperature may be obtained by blending the exhaust gas directly from the kiln outlet with exhaust gas used in pre-heating of the cement raw materials and/or subjected to dust removal. These two hot gas streams could furthermore be blended with ambient air as a third stream to fine tune the temperature as needed for heating the liquid absorbent.

The hot exhaust gas may be contacted with the $CO_2$ rich liquid absorbent to be cleaned, for example in an indirect contact heat exchanger. Alternatively, the hot exhaust gas may be used to produce steam, which is then used for heating the liquid absorbent. In a typical amine based $CO_2$ capture system, this heat integration may increase the $CO_2$ rich amine solution temperature by about 2-10° C. This temperature increase may correspond to a reduction in reboiler duty in the regenerator in the range of about 5-15 percent. The used "cold" exhaust gas may for example be directed to the $CO_2$ scrubber or sent back to the cement manufacturing plant for use in drying or preheating the cement raw materials, e.g. in the raw mill.

This general principle of heat integration is applicable to all types of cement manufacturing plants, e.g. dry, wet, semi-dry or semi-wet processes, where a produced $CO_2$ rich exhaust gas is treated in a $CO_2$ absorption process, which utilizes thermal regeneration of the $CO_2$ absorbent.

According to an embodiment, the hot exhaust gas stream comprises exhaust gas directly from the cement kiln. The temperature of this exhaust gas may typically be in the range of 800° C. to 1200° C.

According to an embodiment, the hot exhaust gas stream comprises exhaust gas from the cement kiln, which has first been used in pre-heating of the cement raw materials and/or subjected to dust removal. The temperature of this exhaust gas may typically be in the range of 100° C. to 300° C.

According to an embodiment, the hot exhaust gas stream is formed by blending exhaust gas directly from the cement kiln with exhaust gas from the cement kiln, which has first been used in pre-heating of the cement raw materials and/or subjected to dust removal. The temperature of the blended exhaust gas may typically be in the range of 150° C. to 500° C.

According to an embodiment, the hot exhaust gas stream is formed by blending exhaust gas directly from the gas outlet of the cement kiln or exhaust gas from the gas outlet of the cement kiln, which has first been used in pre-heating of the cement raw materials and/or subjected to dust removal, or a blend thereof, with ambient air.

According to an embodiment, the hot exhaust gas stream is used for heating of the liquid absorbent by indirect heat exchange.

According to an embodiment, the hot exhaust gas stream is used to produce steam, and said steam is used for heating the liquid absorbent by indirect heat exchange.

According to an embodiment, the hot exhaust gas stream used for heating the liquid absorbent is subsequently directed to the scrubbing step.

According to an embodiment, the hot exhaust gas stream used for heating the liquid absorbent is subsequently used for drying or pre-heating cement raw materials, e.g. in a raw mill of the cement manufacturing plant.

The liquid absorbent may be any physically or chemically $CO_2$ absorbing solvent or solution or slurry. The liquid absorbents may for example comprise alkanolamines, amino acid salts, ammonia solvents and carbonate solvents.

According to an embodiment, the liquid absorbent is an aqueous amine or ammonia solution or slurry.

In some embodiments, where ammonia ($NH_3$) is present or introduced into the exhaust gas stream, the method comprises:
a) scrubbing in a scrubbing step an $NH_3$ rich exhaust gas stream with a liquid absorbent such that an $NH_3$ rich liquid absorbent is formed;
b) cleaning the $NH_3$ rich liquid absorbent by heating it to separate $NH_3$ from the liquid absorbent, such that an $NH_3$ lean liquid absorbent is regenerated; and
c) recycling regenerated $NH_3$ lean liquid absorbent for use in the scrubbing step;
characterized in that the heating of the $NH_3$ rich liquid absorbent is at least partially effected using a hot exhaust gas stream generated in the cement kiln.

According to other aspects illustrated herein, there is provided a gas cleaning system for removing contaminants from an exhaust gas stream generated in the kiln of the cement manufacturing plant by bringing the exhaust gas stream into contact with a circulating liquid absorbent stream such that contaminants are absorbed in said liquid absorbent, said gas cleaning system comprising:
a scrubber configured to receive a contaminant rich exhaust gas stream and contact the gas stream with a stream of a liquid absorbent to form a stream of contaminant rich liquid absorbent;
a regenerator configured to receive a stream of contaminant rich liquid absorbent from the scrubber, and heat the contaminant rich liquid absorbent to separate contaminants from the liquid absorbent to regenerate a stream of contaminant lean liquid absorbent, and to return said regenerated stream of contaminant lean liquid absorbent to the scrubber;
characterized in that the gas cleaning system comprises a heat exchanger configured to receive a hot exhaust gas stream from the kiln of the cement manufacturing plant to effect, at least partially, the heating of the contaminant rich liquid absorbent.

According to an embodiment, the cement manufacturing plant comprises a gas cleaning system for removing carbon dioxide ($CO_2$) from an exhaust gas stream generated in the kiln of the cement manufacturing plant by bringing the exhaust gas stream into contact with a circulating liquid absorbent stream such that $CO_2$ is absorbed in said liquid absorbent, said gas cleaning system comprising:
a $CO_2$ scrubber configured to receive a $CO_2$ rich exhaust gas stream and contact the gas stream with a stream of a liquid absorbent to form a stream of $CO_2$ rich liquid absorbent;
a regenerator configured to receive a stream of $CO_2$ rich liquid absorbent from the $CO_2$ scrubber, and heat the $CO_2$ rich liquid absorbent to separate $CO_2$ from the liquid absorbent to regenerate a stream of $CO_2$ lean liquid absorbent, and to return said regenerated stream of $CO_2$ lean liquid absorbent to the $CO_2$ scrubber;
characterized in that the gas cleaning system comprises a heat exchanger configured to receive a hot exhaust gas stream from the kiln of the cement manufacturing plant to effect, at least partially, the heating of the $CO_2$ rich liquid absorbent.

The heat exchanger is configured to receive a hot exhaust gas stream from the kiln of the cement manufacturing plant. This means that the cement manufacturing plant may comprise a gas conduit operative for feeding hot exhaust gas from the kiln to the heat exchanger.

According to an embodiment, the heat exchanger is configured to receive a hot exhaust gas stream directly from the kiln of the cement manufacturing plant.

According to an embodiment, the heat exchanger is configured to receive a hot exhaust gas stream, which has first been used in pre-heating of the cement raw materials and/or subjected to dust removal.

According to an embodiment, the heat exchanger is configured to receive a hot exhaust gas stream comprising a mixture of exhaust gas directly from the kiln of the cement manufacturing plant and exhaust gas which has first been used in pre-heating of the cement raw materials and/or subjected to dust removal.

According to an embodiment, the heat exchanger is an indirect contact heat exchanger.

According to an embodiment, the gas cleaning system comprises a first heat exchanger configured to receive a first portion of a hot exhaust gas stream from the cement manufacturing plant and heat the $CO_2$ rich liquid absorbent to a first temperature, and a second heat exchanger configured to receive a second portion of a hot exhaust gas stream from the cement manufacturing plant and heat the $CO_2$ rich liquid absorbent to a second temperature.

According to an embodiment, the gas cleaning system for removing $CO_2$ is an amine or ammonia based system, for example, a chilled ammonia based system for removing $CO_2$.

In some embodiments, e.g. wherein the gas cleaning system comprises an ammonia based system such as a chilled ammonia based system, the cement manufacturing plant comprises a gas cleaning system for removing ammonia ($NH_3$) from an exhaust gas stream generated in the kiln of the cement manufacturing plant by bringing the exhaust gas stream into contact with a circulating liquid absorbent stream such that $NH_3$ is absorbed in said liquid absorbent, said gas cleaning system comprising:
a $NH_3$ scrubber configured to receive an $NH_3$ rich exhaust gas stream and contact the gas stream with a stream of a liquid absorbent to form a stream of $NH_3$ rich liquid absorbent;
a regenerator configured to receive a stream of $NH_3$ rich liquid absorbent from the $NH_3$ scrubber, and heat the $NH_3$ rich liquid absorbent to separate $NH_3$ from the liquid absorbent to regenerate a stream of $NH_3$ lean liquid absorbent, and to return said regenerated stream of $NH_3$ lean liquid absorbent to the $NH_3$ scrubber;

characterized in that the gas cleaning system comprises a heat exchanger configured to receive a hot exhaust gas stream from the kiln of the cement manufacturing plant to effect, at least partially, the heating of the $NH_3$ rich liquid absorbent.

The above described and other features are exemplified by the following figures and detailed description. Further objects and features of the present invention will be apparent from the description and the claims.

BRIEF DESCRIPTION OF THE DRAWINGS

Referring now to the figures, which are exemplary embodiments, and wherein the like elements are numbered alike.

DESCRIPTION OF PREFERRED EMBODIMENTS

Basically, cement is produced in two steps. In the first step, cement clinker is produced from raw materials consisting mainly of limestone and clay. The clinker production process may be characterized as a dry, wet, semi-dry or semi-wet process depending on the state of the raw materials. In the second step, cement is produced from the cement clinker. The clinker is ground to a fine and homogenous powder together with gypsum (calcium sulphates) and possibly additional cementitious (such as blastfurnace slag, coal fly ash, natural pozzolanas, etc.) or inert materials (limestone).

Figure 1:
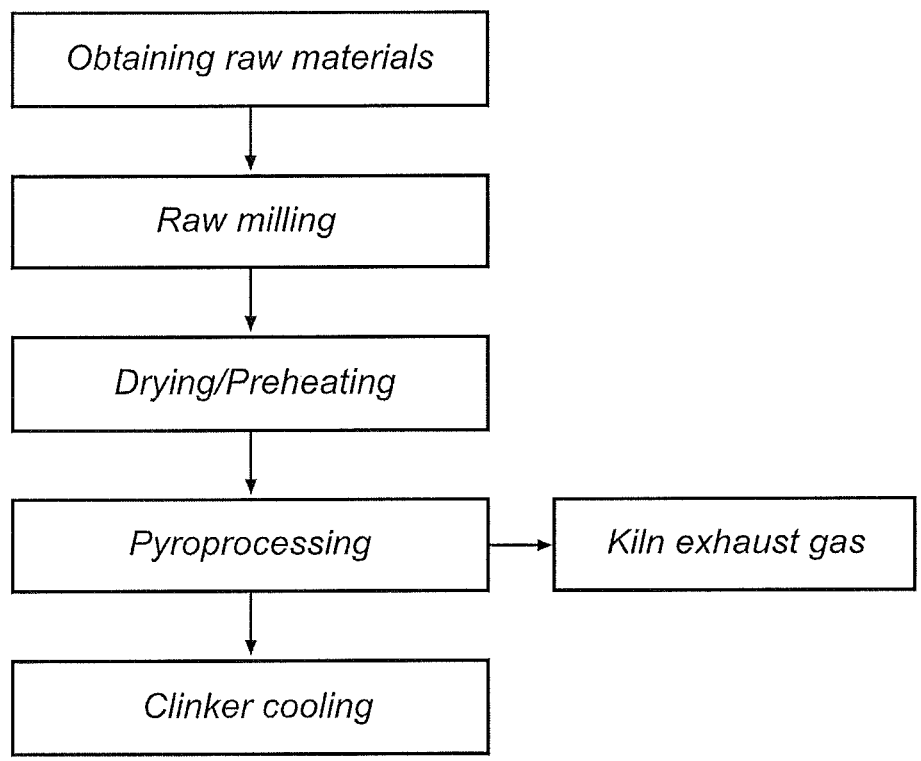
FIG. 1 is a flow scheme representing the clinker production process of a cement manufacturing plant.

FIG. 1 is a flow scheme depicting generally the main steps of the clinker production process. Cement raw materials, generally lime (calcareous), silica (siliceous), alumina (argillaceous), and iron (ferriferous) are obtained by mining or quarrying. In the clinker production process, the raw materials are crushed and homogenised, e.g. in a raw mill, into a mixture which is fed into a rotary kiln. This process, generally referred to as raw milling, may be characterized as a dry, wet, semi-dry or semi-wet process depending on the state of the raw materials. In the dry process, the raw materials are ground dry and fed to the kiln as a powder. In the wet process, the raw materials are ground wet and fed to the kiln as a slurry. In the semi-dry process, the raw materials are ground dry and then moistened to form nodules, which can then be fed to the kiln. In the semi-wet process, the raw materials are ground wet in a slurry and dewatered before being fed to the kiln.

The kiln is a large rotating pipe, generally about 50 to 100 m long and up to 6 m in diameter. The kiln is heated by a flame to reach a temperature of about 2000° C. inside of it. The kiln is slightly inclined to allow the materials to slowly reach the other end by gravity, where they quickly cool to 100-200° C.

Generally, four basic oxides in the correct proportions are used to make cement clinker, calcium oxide (about 65%), silicon oxide (about 20%), alumina oxide (about 10%) and iron oxide (about 5%). These elements mixed homogeneously will combine when heated by the flame to a temperature of approximately 1450° C. During this process, generally referred to as pyroprocessing, new compounds are formed, such as silicates, aluminates and ferrites of calcium. Hydraulic hardening of cement is caused by hydration of these compounds. The product obtained is called clinker, and is generally present in the form of 1-10 mm nodules formed due to partial melting of the material in the kiln.

During the pyroprocessing process, $CO_2$ is emitted. $CO_2$ emissions are both raw material-related and energy-related. Raw material-related emissions, i.e. $CO_2$ emissions produced during limestone decarbonation, account for about 60% and combustion of fuels account for about 40% of total $CO_2$ emissions from the cement process.

The exhaust gases from a modern kiln may typically amount to about 2 tonnes per tonne of clinker made. The kiln outlet gas may for example have a temperature of about 1000° C. when it leaves the kiln. The hot kiln exhaust gas is generally used for pre-heating the raw materials prior to introduction of the materials into the kiln. The pre-heating may for example be performed in one or more grate pre-heaters and/or gas-suspension pre-heaters.

The exhaust gases from the kiln carry a large amount of dust, typically about 30 grams per cubic meter. Environmental regulations generally require reduction of this amount to about 0.1 gram per cubic meter, requiring dust removal to be at least 99.7% efficient. Methods of dust removal include electrostatic precipitators and bag-filters. The temperature of the kiln outlet gases after use in pre-heating the raw materials and after dust removal is typically about 150° C.

In order to reduce the amount of $CO_2$ released to the atmosphere, the cement plant is provided with a gas cleaning system for removing $CO_2$ from the kiln exhaust gas (kiln gas). The gas cleaning system contacts the kiln exhaust gas with a liquid absorbent capable of at least partially absorbing $CO_2$ to form liquid absorbent "rich" in $CO_2$. When the liquid absorbent has absorbed a predetermined amount of $CO_2$, it can be regenerated. Regeneration of the liquid absorbent generally comprises heating the liquid absorbent to a temperature, at which at least some of the $CO_2$ absorbed is released. The $CO_2$ released during regeneration is generally compressed and sent to storage. The liquid absorbent from the regeneration, referred to as "lean" liquid absorbent, can then be recycled and used for absorbing further $CO_2$ from the kiln exhaust gas.

The "liquid absorbent" for absorption of $CO_2$ may be any physically or chemically $CO_2$ absorbing solvent or solution or slurry. Such compositions are well known to a person skilled in the art. Examples of liquid absorbents commonly used in absorption of $CO_2$ from gas streams include aqueous solutions of ammonia or certain amine compounds. Examples of such amine compounds commonly used in absorption of $CO_2$ from gas streams include, but are not limited to, monoethanolamine (MEA), diethanolamine (DEA), methyldiethanolamine (MDEA), diisopropylamine (DIPA) and aminoethoxyethanol (diglycolamine) (DGA). The most commonly used amine compounds in industrial plants are the alkanolamines MEA, DEA, and MDEA. The liquid absorbent may comprise a single amine compound or a mixture of two or more amine compounds. The liquid absorbents may also comprise alkanolamines, amino acid salts, ammonia solvents and carbonate solvents. The liquid absorbent may also comprise varying amounts of absorbed $CO_2$. Liquid absorbent containing none or only a low concentration of absorbed $CO_2$, e.g. following regeneration, is referred to as "$CO_2$ lean" or simply "lean" liquid absorbent, whereas liquid absorbent containing higher concentrations of absorbed $CO_2$, e.g. following absorption, is referred to as "$CO_2$ rich" or simply "rich" liquid absorbent.

Figure 2:
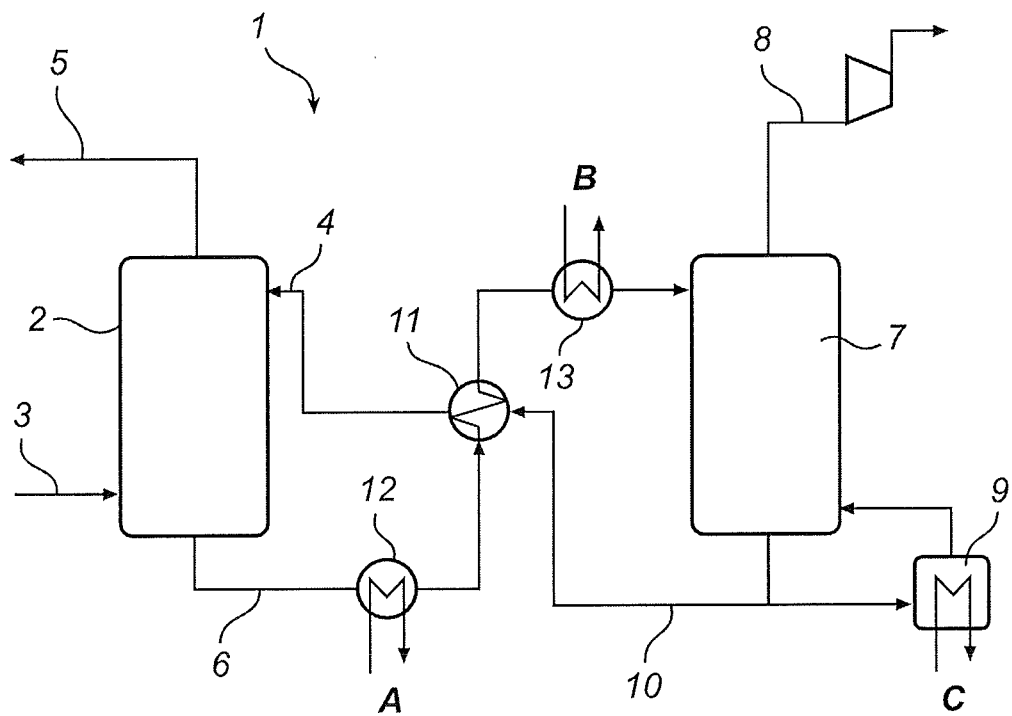
FIG. 2 schematically depicts a cement manufacturing plant comprising an amine based $CO_2$ capture system.
Figure 2:
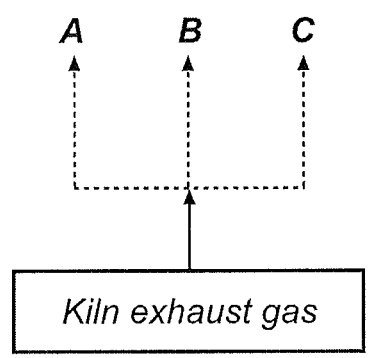

The gas cleaning system may be an amine based carbon dioxide ($CO_2$) capture system. FIG. 2 is a schematic representation of an amine based $CO_2$ capture system 1. The system comprises a $CO_2$ scrubber 2 arranged to allow contact between a gas stream to be purified and one or more liquid absorbents. The scrubber 2 represented in FIG. 2 comprises a $CO_2$ absorption section and may also comprise a subsequent water wash section for removing residual contaminants from the gas stream. Exhaust gas from which $CO_2$ is to be removed, is fed to the scrubber 2 via line 3. In the $CO_2$ absorption section, the exhaust gas is contacted with an first absorbent liquid comprising an amine compound, e.g. by bubbling the exhaust gas through said first liquid absorbent or by spraying the first liquid absorbent into the exhaust gas. The first liquid absorbent is fed to the scrubber 2 via line 4. In the $CO_2$ absorption section, $CO_2$ from the exhaust gas is absorbed in the first liquid absorbent. Exhaust gas depleted of $CO_2$ in the $CO_2$ absorption section then enters the water wash section of the scrubber 2. The water wash section is arranged to allow contact between the exhaust gas depleted of $CO_2$ from the $CO_2$ absorption section and a second liquid absorbent, which is generally water. In the water wash section, contaminants remaining in the exhaust gas when it leaves the $CO_2$ absorption section are absorbed in the second liquid absorbent. Exhaust gas depleted of $CO_2$ and contaminants leaves the scrubber 2 via line 5. The used first and second liquid absorbent containing absorbed $CO_2$ and contaminants leave the scrubber 2 via line 6. The used first and second liquid absorbent may be recycled in the regenerator 7, wherein contaminants and $CO_2$ are separated from the wash water. The separated $CO_2$ leaves the system via line 8.

The used "rich" first and second liquid absorbents to be cleaned enter the regenerator 7 via line 6. In the regenerator 7, the used liquid absorbents are heated, generally using steam, in a reboiler 9. The heating causes desorption of absorbed $CO_2$ from the liquid absorbents. The desorbed $CO_2$ then exits the regenerator 7 via line 8 together with some water vapor also formed during heating. Regenerated "lean" liquid absorbent, containing a reduced concentration of $CO_2$, leaves the regenerator via line 10. The "lean" liquid absorbent is recycled to the $CO_2$ scrubber 2 for use in the absorption of additional $CO_2$.

Alternatively, the gas cleaning system may be a Chilled Ammonia based system. The general principle of the Chilled Ammonia based system is the same as in the amine based system, but the liquid absorbent and operating conditions are different. WO 2006/022885 discloses one such Chilled Ammonia system and process for removing carbon dioxide from a exhaust gas, which method includes capturing carbon dioxide from a exhaust gas cooled to a temperature below ambient temperature (preferably between 0° C. and 20° C., more preferably between 0° C. and 10° C.) in a $CO_2$ scrubber by means of an ammoniated solution or slurry. The $CO_2$ is absorbed by the ammoniated solution in the scrubber at a temperature between 0° C. and 20° C., more preferably between 0° C. and 10° C., after which the ammoniated solution is cleaned in a regenerator under elevated pressure, generally in the range of 10 to 30 bar absolute, and elevated temperature, generally in the range of 120° C. to 160° C., to allow the $CO_2$ to escape the ammoniated solution as gaseous carbon dioxide of high purity.

The regeneration in the gas cleaning system is generally performed at higher temperature than the absorption. For example, in the Chilled Ammonia process, the temperature of the liquid absorbent in the absorber may be in the range of 0° C. to 20° C. and the temperature of the liquid absorbent in the regenerator may be in the range of 120-200° C., such as in the range of 120-160° C. In a typical amine based process, the temperature of the liquid absorbent in the absorber may be in the range of 20° C. to 60° C. and the temperature of the liquid absorbent in the regenerator may be in the range of 100-150° C. The regenerator of the gas cleaning system may use any suitable heat source for heating the rich liquid absorbent to the temperature required for effecting $CO_2$ release. Generally low, medium or high pressure steam is used as the heat source, depending on the type of liquid absorbent and the operating pressure of the regenerator. To reduce the heating and cooling duties of the process, the hot lean liquid absorbent from the regenerator is generally subjected to heat exchange with the cold rich liquid absorbent from the absorber in a cross heat exchanger.

According to the embodiments described herein, the hot kiln exhaust gas (kiln gas) produced in the cement manufacturing plant is used to replace at least a portion of the heating requirement of the regenerator. This general principle of heat integration is applicable to all types of cement manufacturing plants, e.g. dry, wet, semi-dry or semi-wet processes, where a produced $CO_2$ rich exhaust gas is treated in a $CO_2$ absorption process, which utilizes thermal regeneration of the $CO_2$ absorbent.

The hot kiln gas may be withdrawn from one or more suitable positions of the cement manufacturing plant. The hot kiln exhaust gas may for example be withdrawn directly from the kiln outlet, where the temperature of the gas is very high, typically in the range of 800° C. to 1200° C. Alternatively, the hot kiln gas may first be used in pre-heating of the raw materials and/or subjected to dust removal, before it is withdrawn. In this case, the temperature of the withdrawn kiln gas may be significantly lower, typically in the range of 100° C. to 300° C.

According to an embodiment, a hot gas stream directly from the kiln is blended with a stream of kiln gas first used in pre-heating of the raw materials and subjected to dust removal. Blending these two gas streams allows the temperature of the gas stream to be adjusted. The possibility of adjusting the temperature of the hot kiln gas is very useful in order to optimize the heat transfer from the hot kiln gas to the rich liquid absorbent. The proportions of the hot kiln gas directly from the kiln and the kiln gas first used in pre-heating of the raw materials and subjected to dust removal, may for example be selected such that the temperature of the blend is sufficient for heating the rich liquid absorbent to, or close to, its boiling point. The temperature of the blend may typically be in the range of 150° C. to 500° C.

The hot kiln gas may be used for heating the rich liquid absorbent in various positions in the gas cleaning system. A few of the possible positions are the positions A, B and C, shown in FIG. 2, or in a combination of two or more of positions A, B and C.

The heating may be performed in one or more indirect heat exchangers. By the term "indirect heat exchanger" as used herein, means a heat exchanger configured for heat exchange between two fluid streams without mixing of the two fluid streams. The heat exchanger may for example be of the shell and tube type. Suitable types and dimensions of heat exchangers are readily identified by the person skilled in the art.

According to one embodiment, the hot kiln gas is used in position A for heating the cold rich liquid absorbent coming from the absorber 2 in heat exchanger 12, before the rich liquid absorbent has passed through the cross heat exchanger 11.

According to an alternative embodiment, the hot kiln gas is used in position B for heating the rich liquid absorbent coming from the cross heat exchanger 11 in a heat exchanger 13, before the rich liquid absorbent enters the regenerator.

According to another alternative embodiment, the hot kiln gas is divided into two portions in a gas splitter, and a first portion of the hot kiln gas is used in position A for heating the cold rich liquid absorbent coming from the absorber 2, and a second portion of the hot kiln gas is used in position B for heating the rich liquid absorbent coming from the cross heat exchanger 11.

According to another alternative embodiment, the hot kiln gas is used in position C for heating the rich liquid absorbent in the reboiler 9 of the regenerator 7.

According to another alternative embodiment, the hot kiln gas is used for the production of steam, which is used in position C for heating the rich liquid absorbent in the reboiler 9 of the regenerator 7.

The hot kiln gas used for heating the rich liquid absorbent, referred to hereinafter as "cold kiln gas", may subsequently be reintroduced into the system at a number of different positions depending on its temperature and purity.

The cold kiln gas may for example be introduced into the $CO_2$ scrubber of the gas cleaning system for removal of $CO_2$.

Alternatively, the cold kiln gas may be returned to the cement manufacturing plant for use in preheating of the cement raw materials and/or for removal of dust, before use in the $CO_2$ scrubber of the gas cleaning system.

In a dry or semi-dry process cement manufacturing plant, the cold kiln gas may for example be introduced into the raw mill for pre-heating of raw materials to be fed to the kiln and subsequent dust removal, before use in the gas cleaning system for $CO_2$ removal.

In a wet or semi-wet process cement manufacturing plant, the cold kiln gas may for example be introduced into the coal mill for pre-heating of the kiln fuel.

While the invention has been described with reference to a number of preferred embodiments, it will be understood by those skilled in the art that various changes may be made and equivalents may be substituted for elements thereof without departing from the scope of the invention.

Particularly, the invention has been described herein mainly with reference to $CO_2$ absorption and release, however, it is readily realized that heat integration is also applicable to other heat intensive unit operations in the gas cleaning method/system. One example includes the water wash step commonly used in the chilled ammonia process for removal of residual ammonia in the $CO_2$ depleted flue gas. The water or aqueous solution used for absorption of ammonia from the flue gas in the water wash step is generally treated in a stripper to remove absorbed ammonia before being recycled in the water wash step. The hot kiln gas may be used for reducing the steam requirement of the stripper in a similar way to that described above for the $CO_2$ removal.

In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of cleaning an exhaust gas stream generated in a cement kiln, the method comprising:
    a) scrubbing in a scrubbing step a contaminant rich exhaust gas stream with a liquid absorbent such that a contaminant rich liquid absorbent is formed;
    b) cleaning the contaminant rich liquid absorbent by heating it to separate contaminant from the liquid absorbent, such that a contaminant lean liquid absorbent is regenerated; and
    c) recycling regenerated contaminant lean liquid absorbent for use in the scrubbing step;
    characterized in that the heating of rich liquid absorbent is at least partially effected using a hot exhaust gas stream generated in the cement kiln.

2. A method of cleaning an exhaust gas stream generated in a cement kiln, the method comprising:
    a) scrubbing in a scrubbing step a $CO_2$ rich exhaust gas stream with a liquid absorbent such that a $CO_2$ rich liquid absorbent is formed;
    b) cleaning the $CO_2$ rich liquid absorbent by heating it to separate $CO_2$ from the liquid absorbent, such that a $CO_2$ lean liquid absorbent is regenerated; and
    c) recycling regenerated $CO_2$ lean liquid absorbent for use in the scrubbing step;
    characterized in that the heating of $CO_2$ rich liquid absorbent is at least partially effected using a hot exhaust gas stream generated in the cement kiln.

3. A method of cleaning an exhaust gas stream generated in a cement kiln, the method comprising:
    a) scrubbing in a scrubbing step an $NH_3$ rich exhaust gas stream with a liquid absorbent such that an $NH_3$ rich liquid absorbent is formed;
    b) cleaning the $NH_3$ rich liquid absorbent by heating it to separate $NH_3$ from the liquid absorbent, such that an $NH_3$ lean liquid absorbent is regenerated; and
    c) recycling regenerated $NH_3$ lean liquid absorbent for use in the scrubbing step;
    characterized in that the heating of the $NH_3$ rich liquid absorbent is at least partially effected using a hot exhaust gas stream generated in the cement kiln.

4. A method according to claim 1, wherein said hot exhaust gas stream comprises exhaust gas directly from the cement kiln.

5. A method according to claim 1, wherein said hot exhaust gas stream comprises exhaust gas from the cement kiln first used in pre-heating of the cement raw materials and/or subjected to dust removal.

6. A method according to claim 1, wherein said hot exhaust gas stream is formed by blending exhaust gas directly from the cement kiln with exhaust gas from the cement kiln first used in pre-heating of the cement raw materials and/or subjected to dust removal.

7. A method according to claim 1, wherein said hot exhaust gas stream is used for heating of the liquid absorbent by indirect heat exchange.

8. A method according to claim 1, wherein said hot exhaust gas stream is used to produce steam, and said steam is used for heating the liquid absorbent by indirect heat exchange.

9. A method according to claim 2, wherein said hot exhaust gas stream used for heating the liquid absorbent is subsequently directed to the scrubbing step.

10. A method according to claim 2, wherein said liquid absorbent is an aqueous amine or ammonia solution or slurry.

* * * * *